(12) United States Patent
Bobier

(10) Patent No.: US 8,077,697 B2
(45) Date of Patent: Dec. 13, 2011

(54) OFF NETWORK MOBILE TO MOBILE CALLING USING SIP PROTOCOL

(75) Inventor: Joseph A. Bobier, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 898 days.

(21) Appl. No.: 12/150,364

(22) Filed: Apr. 28, 2008

(65) Prior Publication Data

US 2008/0279175 A1 Nov. 13, 2008

Related U.S. Application Data

(60) Provisional application No. 60/928,581, filed on May 10, 2007.

(51) Int. Cl.
*H04J 3/06* (2006.01)
(52) U.S. Cl. ......... 370/350; 370/324; 370/328; 370/338
(58) Field of Classification Search .................. 370/321, 370/322, 324, 337, 347, 350, 493, 328, 338; 455/445
See application file for complete search history.

(56) References Cited

U.S. PATENT DOCUMENTS

| | | | |
|---|---|---|---|
| 7,626,966 B1* | 12/2009 | Ruiter et al. | 370/337 |
| 2006/0040670 A1* | 2/2006 | Li et al. | 455/445 |
| 2006/0268813 A1* | 11/2006 | Larsson et al. | 370/347 |
| 2006/0268908 A1 | 11/2006 | Wang et al. | |
| 2007/0171910 A1* | 7/2007 | Kumar | 370/392 |
| 2008/0205452 A1* | 8/2008 | Chou | 370/493 |

* cited by examiner

*Primary Examiner* — Hassan Kizou
*Assistant Examiner* — Toan Nguyen
(74) *Attorney, Agent, or Firm* — Dennis L. Cook, Esq.

(57) ABSTRACT

This invention addresses the need to transport high bit-rate data to multiple users, or between users, over wired and wireless means. Specifically, this disclosure describes a new method of enabling communication from mobile phone to mobile phone when no network services are available as long as radio contact between the mobile handsets is possible by reserving un-assigned timeslots in the medium access control protocol super frame structure.

1 Claim, 1 Drawing Sheet xMax Super Frame Structure

OFF NETWORK MOBILE TO MOBILE CALLING USING SIP PROTOCOL

CROSS-REFERENCE TO RELATED APPLICATION

The present application claims the benefit of previously filed Provisional Patent Application Ser. No. 60/928,581 filed May 10, 2007.

FIELD OF THE INVENTION

This disclosure describes a new method of enabling communication from mobile phone to mobile phone when no network services are available.

BACKGROUND OF THE INVENTION

The new wireless physical layer technology developed by xG Technology Inc., referred to as xMAX, enables extremely low power omni-directional transmissions to be received in a wide area. Using xMAX, significant bandwidth can be made available for supporting various wireless applications. Voice Over IP (VOIP) based cellular services are now being developed using xMAX. In xMAX-based cellular networks both the base station and the handsets will be equipped with an xMAX transceiver. A mobile device (xMAX handset) in such a network will be free to move in the radius covered by an xMAX base station. Thus mobile telephones provide valuable communications service for millions of users. However once access to the mobile service provider network is lost, the phones have no value for communication.

BRIEF SUMMARY OF THE INVENTION

Voice Over IP (VOIP) based cellular services are now being developed using xMAX. In xMAX-based cellular networks both the base station and the handsets will be equipped with an xMAX transceiver. A mobile device (xMAX handset) in such a network will be free to move in the radius covered by an xMAX base station. This disclosure teaches a new method of enabling communication from mobile phone to mobile phone when no network services are available.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which.

DETAILED DESCRIPTION OF THE INVENTION

Figure 1:
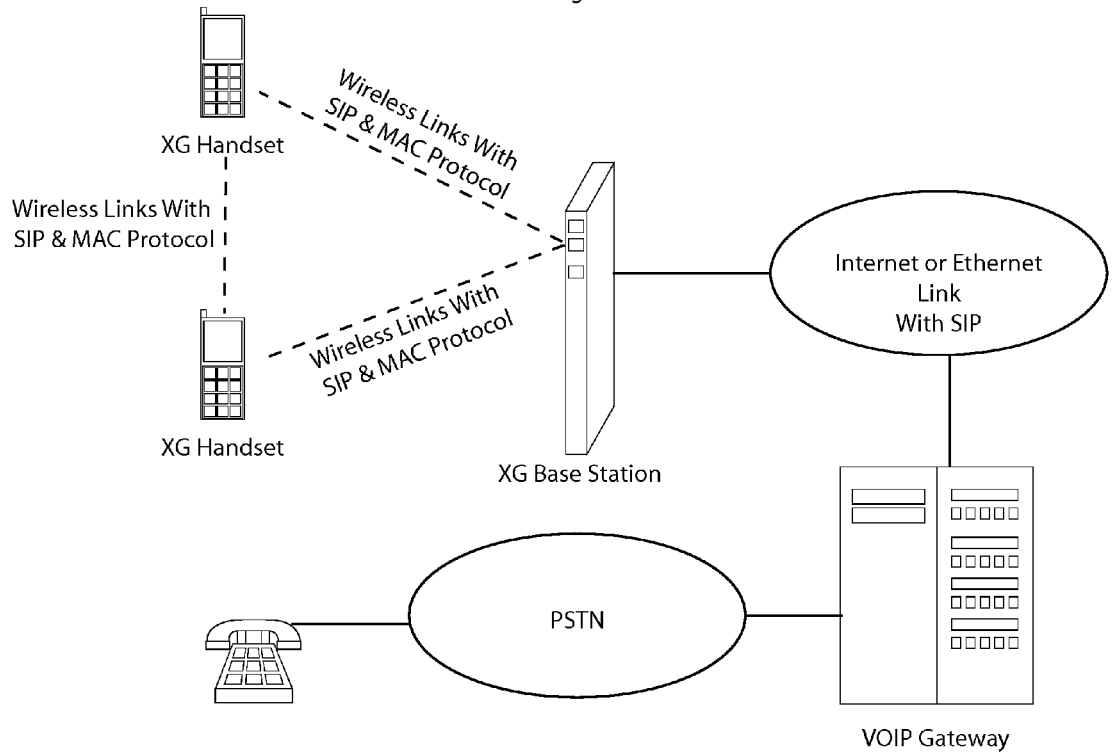
FIG. 1 is a representation of an xMax deployment scenario.

In VOIP-based cellular networks xMAX handsets (or mobile nodes) are equipped with the complete VOIP stack. The xMAX base station is connected to the Internet through an Ethernet port. The mobile nodes communicate with the xMAX base station to reach a VOIP gateway. FIG. 1 depicts the deployment scenario.

SIP, or Session Initiation Protocol, is a networking protocol that enables a VoIP or Voice over Internet Protocol phone for Internet use. The SIP standard is well known and widely used in fixed line telephone systems. Many companies are working to bring SIP phones to the mobile arena. Since mobile SIP services are not widely available and likely will not be for some time to come, an improvement has been devised as disclosed in this application to allow mobile SIP telephones to communicate, or call each, other even when no wireless network is available. This has many practical advantages. For instance individuals in remote locations can use the phones as "walkie talkies" so long as they are within radio range of each other. In emergency situations, such as during the aftermath of natural disasters, families and others who need to stay in touch can continue to call each other despite the failure of wireless networks. Failure of wireless networks is common after hurricanes and the like.

The SIP standard already does allow for direct phone to phone calling, bypassing provider switching services, so long as a network medium exists. The improvement described herein eliminates the need for the network element, so long as radio contact between the mobile handsets is possible.

Mobile handsets are designed to communicate through a wireless network. CDMA, GSM, Wi-Max and other standards are network centric. Specifically, this invention is applied by example in the preferred embodiment to xMax, a wireless physical layer owned and utilized by xG Technology, Inc. as discussed above, although other wireless standards can be modified for the same intent.

For the sake of clarity, without diminishing the applicability of this invention to other wireless standards, an example is given to explain how the physical, or MAC layer, of xMax can be modified to allow off-network point to point mobile calling using SIP.

Figure 2:
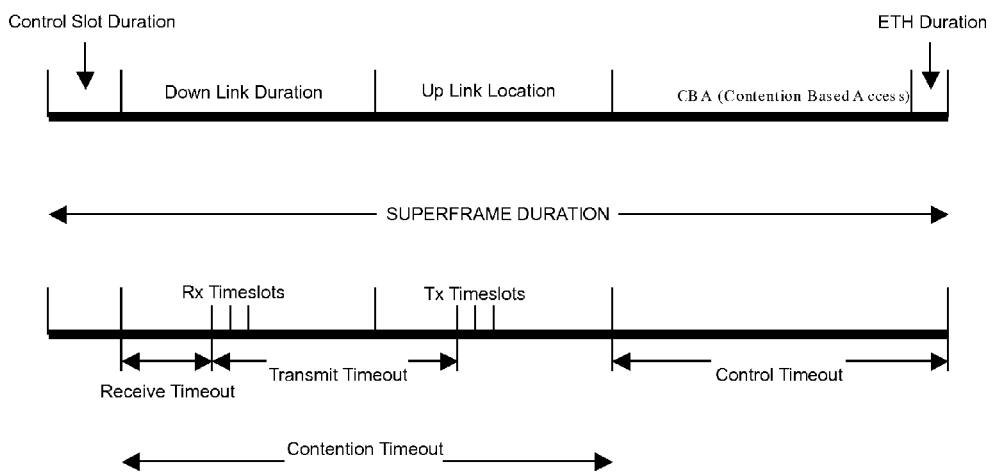
FIG. 2 is a representation of a super-frame format in xMAC.

The mobile devices must be able to either work in the complete absence of the mobile wireless network, or concurrently with an existing mobile network; not using the mobile network, but rather working in a coordinated fashion so as not to disrupt the mobile network and its normal users.

xMax is a TDMA system. The typical super frame as shown in FIG. 2 has a duration of 30 ms and might contain up to hundreds of timeslots, during which individual handsets may communicate. Each handset is assigned a pair of timeslots during which digital voice packets are transferred to and from the base station. The base station will transfer the voice packets to an Internet destination using VoIP protocol.

Since the object of the invention is to allow point to point calling between handsets, without the use and advantages of the wireless network which is managed by the base station, the handsets must be sensitive to the existence of a wireless network and avoid communicating with the other handset in a way that interrupts other scheduled timeslots for network centric users.

In the case where a network signal is present to one or both point to point communicating handsets, the handsets will take advantage of special network timeslots which are reserved by the base station for such communication. For example, of the hundreds of time slots the base station has available to assign, two or more will be reserved as unused. The independent handsets, being able to hear the base station signal, can listen for the transmitted schedule and simply use the un-assigned and reserved timeslots. The base station is not interfered with and the mobile handsets are free to communicate off-network.

If one off-network handset is able to hear the base station, but the other cannot, the mobile which does hear the base station will assume responsibility for relaying the timing information to the other handset in order to assure no network interference.

In the event no network signal is present to either handset, the handsets are free to assume any timeslot location. The 30 ms super frame structure will remain, but only a small portion of the potential timeslots is used by the two handsets. This will leave hundreds of other timeslots un-used and available for use by other off-network direct callers. In the case that an off network call is taking place and a third handset, which is within radio range of the first off-network callers, wishes to make a call, the new handset will synchronize to the same super frame structure already being used and take ownership of another pair of timeslots. Thus it is possible for hundreds of handsets to synchronize and place point to point calls when found in an off-network scenario, even in the same geographic area.

Since certain changes may be made in the above described off network mobile to mobile calling method without departing from the scope of the invention herein involved, it is intended that all matter contained in the description thereof or shown in the accompanying figures shall be interpreted as illustrative and not in a limiting sense.

What is claimed is:

1. A method of allowing direct communication between two or more mobile handsets without disrupting a wireless network controlled by a base station and other users in the network used for wireless voice over Internet protocol communications comprising:

each of said mobile handsets having a medium access control protocol for wireless communication on a voice over Internet protocol network;

said medium access control protocol having timeslots and containing a session initiation protocol that enables a mobile handset to use voice over Internet protocol to access the Internet;

two or more mobile handsets being within radio range of each other;

each of said mobile handsets having two assigned timeslots in said medium access control protocol during which digital voice packets are transferred to and from the base station during normal network operations;

said base station having two or more reserved timeslots in said medium access control protocol not available to be assigned to any of said mobile handsets joining said voice over Internet protocol network controlled by said base station;

said mobile handsets capable of detecting when a network signal is present and when both of said mobile handsets detect a network signal said mobile handsets communicating directly between each other without the use of or interference with said base station using said reserved timeslots, and when only one of said mobile handsets detects a network signal the mobile handset detecting the network signal relays timing information to the mobile handset not detecting the network signal and then said mobile handsets communicating directly between each other without the use of or interference with said base station using said reserved timeslots, and when neither of said mobile handsets detects a network signal said mobile handsets communicating directly between each other without the use of or interference with said base station using any network timeslots; and, when any additional mobile handset beginning a call when a network signal is not present but other mobile handsets are in communication directly between each other without use of or interference with said base station then said additional mobile handset synchronizing to said medium access control protocol being used by the directly communicating mobile handsets and using any network timeslots other than the network timeslots being used by the directly communicating mobile handsets.

* * * * *